US012353913B1

(12) United States Patent
Kaushikkar et al.

(10) Patent No.: US 12,353,913 B1
(45) Date of Patent: Jul. 8, 2025

(54) HANDLING EVICTION WRITE OPERATIONS CAUSED BY RATE-LIMITED TRAFFIC

(71) Applicant: Apple Inc., Cupertino, CA (US)

(72) Inventors: Harshavardhan Kaushikkar, San Jose, CA (US); Gregory S. Mathews, Saratoga, CA (US); Lakshmi Narasimha Murthy Nukala, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 713 days.

(21) Appl. No.: 17/456,347

(22) Filed: Nov. 23, 2021

Related U.S. Application Data

(60) Provisional application No. 63/239,115, filed on Aug. 31, 2021.

(51) Int. Cl.
*G06F 9/50* (2006.01)
*G06F 13/16* (2006.01)

(52) U.S. Cl.
CPC .......... *G06F 9/5016* (2013.01); *G06F 9/5022* (2013.01); *G06F 9/5033* (2013.01);
(Continued)

(58) Field of Classification Search
CPC .... G06F 9/5016; G06F 9/5022; G06F 9/5033; G06F 9/5038; G06F 13/1621;
(Continued)

(56) References Cited

U.S. PATENT DOCUMENTS 6,686,831 B2  2/2004  Cook et al.
8,509,974 B2  8/2013  Sujan et al.
(Continued)

FOREIGN PATENT DOCUMENTS

CN      110557341 A  *  12/2019

OTHER PUBLICATIONS

Qi, CN110557341A Description Translation, Dec. 10, 2019, <https://worldwide.espacenet.com/publicationDetails/description?CC=CN&NR=110557341A&KC=A&FT=D&ND=3&date=20191210&DB=&locale=en_EP>, pp. 1-21 (Year: 2019).*

*Primary Examiner* — Aimee Li
*Assistant Examiner* — Hsing Chun Lin
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to memory controllers and rate-limited traffic. In some embodiments, an apparatus includes memory controller circuitry configured to satisfy different quality-of-service parameters for multiple different classes of request traffic. The apparatus may also include multiple agents configured to send requests to the memory controller circuitry, where the agents operate according to a rate limit for a first class of traffic. The apparatus may include cache circuitry. In some embodiments, based on an allocation in the cache circuitry for a read operation of the first class that causes an eviction from the cache circuitry, the control circuitry is configured to perform a write operation of evicted data: as the first class of traffic and without counting the write operation toward the rate limit for the first class of traffic. In contrast, the control circuitry may count other write operations of the first class of traffic toward the rate limit.

18 Claims, 6 Drawing Sheets

(52) U.S. Cl.
CPC ........ *G06F 9/5038* (2013.01); *G06F 13/1621* (2013.01); *G06F 13/1689* (2013.01)

(58) Field of Classification Search
CPC ............. G06F 13/1689; G06F 12/0804; G06F 12/0806; G06F 12/0808; G06F 12/0811; G06F 12/0813; G06F 12/0815; G06F 12/0817; G06F 12/082; G06F 12/0822; G06F 12/0824; G06F 12/0826; G06F 12/0828; G06F 12/0831; G06F 12/0833; G06F 12/0835; G06F 12/0837; G06F 12/084; G06F 12/0842
USPC ........................................................ 718/104
See application file for complete search history.

(56) References Cited

U.S. PATENT DOCUMENTS

| | | |
|---|---|---|
| 10,231,314 B2 | 3/2019 | Wendt et al. |
| 2005/0018609 A1 | 1/2005 | Dally et al. |
| 2007/0050564 A1* | 3/2007 | Gunna ................ G06F 12/0831 711/146 |
| 2011/0064084 A1 | 3/2011 | Tatar et al. |
| 2015/0149721 A1* | 5/2015 | Kannan ............... G06F 12/0888 711/122 |
| 2016/0188529 A1* | 6/2016 | Nagarajan ............ G06F 15/781 711/151 |
| 2020/0004700 A1* | 1/2020 | Mathews .............. G06F 15/167 |
| 2021/0124694 A1* | 4/2021 | Verplanken ......... G06F 12/0848 |

\* cited by examiner

HANDLING EVICTION WRITE OPERATIONS CAUSED BY RATE-LIMITED TRAFFIC

This application claims priority to U.S. Provisional Pat. Appl. No. 63/239,115 filed on Aug. 31, 2021, which is incorporated by reference herein in its entirety.

BACKGROUND

Technical Field

This disclosure relates generally to memory controllers and particularly to handling evictions in the context of rate-limited traffic.

Description of the Related Art

System on a chip (SOC) integrated circuits (ICs) generally include one or more processors that serve as central processing units (CPUs) for a system, along with various other components such as memory controllers and peripheral components. Additional components can be included with the SOC to form a given device. However, as the number of transistors that can be achieved on in integrated circuit die has continued to increase, it has been possible to incorporate increased numbers of processors and other components on a given SOC and thus reduce the number of other components needed to form the given device.

Increasing the numbers of processors and other discrete components on an SOC is desirable for increased performance. Additionally, cost savings can be achieved in a device by reducing the number of other components needed to form the device in addition to the SOC. The device may be more compact (smaller in size) if more of the overall system is incorporated into the SOC. Reduced power consumption for the device as a whole can be achieved by incorporating more components into the SOC.

On the other hand, increasing the numbers of processors and other components on the SOC increases the bandwidth requirements between the memory controllers and the components, and can overwhelm the interconnect used to communicate on the SOC which can lead to latency increases. The lack of available bandwidth and increase in latency can reduce the performance benefits that were expected to be achieved by incorporating the components into the SOC.

DETAILED DESCRIPTION

In disclosed embodiments, a memory controller and communication fabric may support multiple classes of traffic. In some embodiments, these classes are assigned to virtual channels in the communication fabric. Different classes may have different quality of service parameters. For example, a low latency traffic (LLT) class may have a quality-of-service priority for latency and the rate at which a given agent may initiate requests may be limited (e.g., using a leaky bucket credit system). Other example traffic classes may include a real-time (RT) class with a bandwidth quality-of-service priority and a bulk class that is used for traffic with lower bandwidth and latency sensitivity.

The system may implement a memory cache in conjunction with the memory controller. Therefore, certain transactions with the memory controller may cause evictions from the memory cache. As one example, an LLT read request may cause eviction of other data in order to allocate an entry in the memory cache for the read data. The memory controller may write such evicted data to memory as LLT traffic (otherwise, waiting for the write to complete as another traffic class might have negative latency implications for the original LLT request). This may be challenging for rate limit circuitry because a requesting agent does not know whether its requests will cause an eviction in the memory cache. In disclosed embodiments, rate limit circuitry is configured not to count eviction write operations caused by LLT requests toward a rate limit for LLT traffic. In some embodiments, this includes adding an extra credit in memory controller rate limit circuitry for the requesting agent while still consuming a credit for the write operation.

In various embodiments, disclosed techniques may advantageously provide expected quality-of-service parameters (e.g., bandwidth, latency, etc.) to a given class of traffic while utilizing a memory cache to improve system performance in some scenarios.

Figure 1:
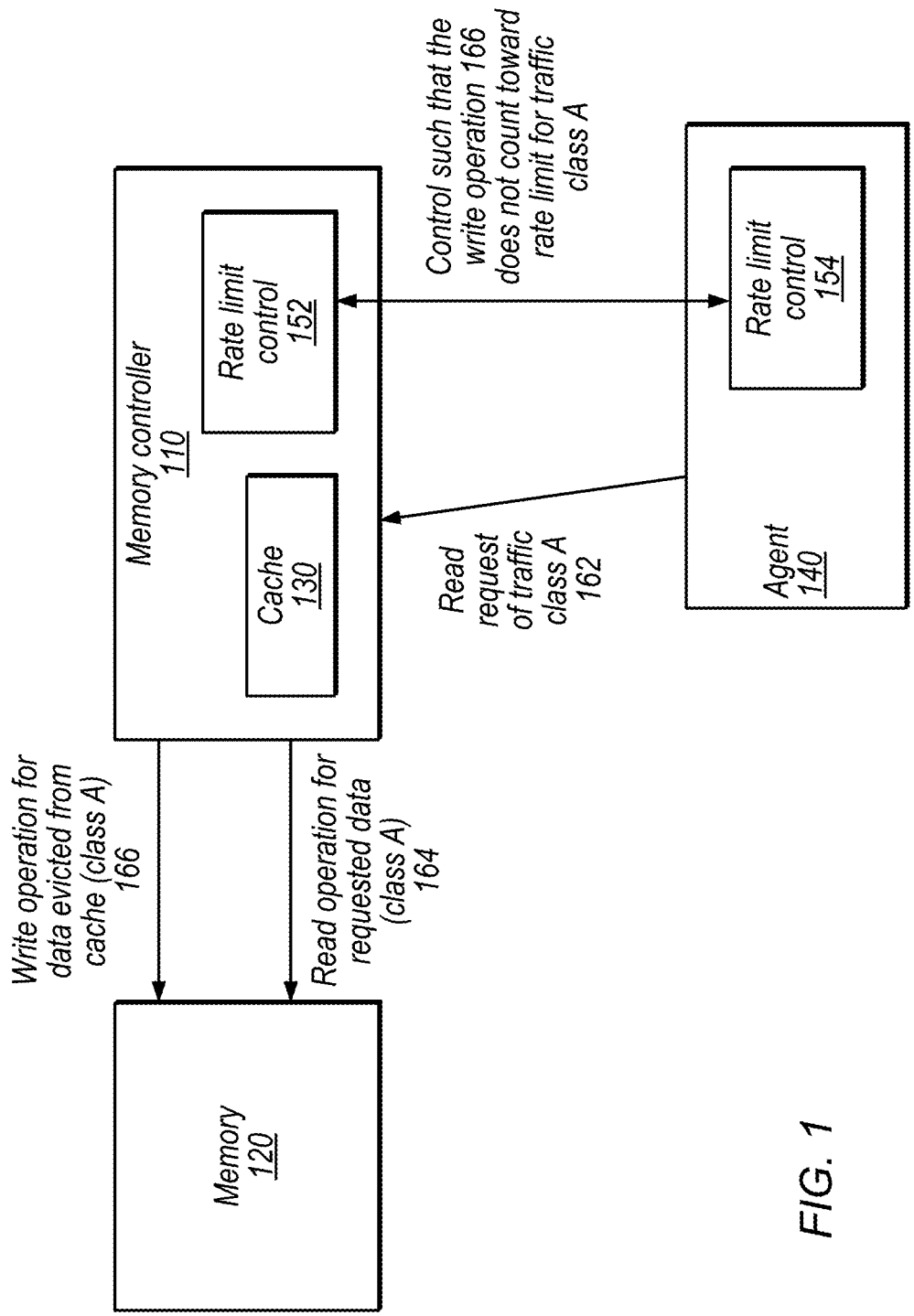
FIG. 1 is a block diagram illustrating an example memory controller that supports rate limit control for one or more traffic classes, according to some embodiments.

FIG. 1 is a block diagram illustrating an example computing system configured to provide the same class of service for an eviction write as the request that caused the eviction, without counting the eviction write toward a rate limit, according to some embodiments. In the illustrated embodiment, the system includes memory controller 110, memory 120, and agent 140.

In the illustrated embodiment, memory controller 110 and agent 140 respectively include rate limit control circuitry 152 and 154. In some embodiments, this control circuitry implements a credit system to limit the rate at which agent 140 is allowed to initiate requests. In some embodiments, the system includes a communication fabric (not shown) between memory controller 110 and multiple agents (including agent 140). Rate limits may be applied to one or more classes of traffic for each of multiple agents. Additionally, rate limits in the memory controller may be applied as composites for multiple agents (including agent 140).

Cache 130, in the illustrated embodiment, is included in memory controller 110. In other embodiments, cache 130 may not be included in memory controller 110 and may communicate with memory controller 110. In various embodiments, memory controller 110 may perform certain operations for cache 130 (e.g., writes to memory from cache 130 or reads from memory to cache 130) according to quality-of-service parameters for a virtual channel from which a corresponding request was received.

In the illustrated example, agent 140 sends a read request of traffic class A 162. For example, class A may be LLT traffic. In this example, request 162 causes an allocation in cache 130 and an eviction to free a cache entry for the allocation. Thus, memory controller initiates both a read operation for the requested data 164 (which is treated as class A, the same class as the request 162, with any corresponding quality-of-service parameters) and a write operation for the data evicted from the cache 166. The write operation 166 for the eviction may need to complete before the read data from the read operation 164 is allowed to be stored in the cache 130, therefore, the write operation 166 is also a class A transaction, in the illustrated example. The write operation 166 may be referred to as an LLT extra (LLTE) transaction.

In embodiments in which class A is rate limited by rate limit control 152, treating write operation 166 as class A may have undesirable results if not handled properly. In particular, if operations such as write operation 166 were to count toward the rate limit for agent 140, then different class A requests from agent 140 may have different impacts on the rate limit depending on whether they cause an eviction from cache 130. As one example, the class A traffic may include isochronous traffic or may share resources with isochronous traffic. Isochronous data may be data that is provided at a regular rate over time. That is, the data may be transmitted at substantially fixed intervals in real time, and variation from the interval may cause underrun or overrun of the data. For audio data, for example, underruns may result in audible skipping in the sounds (or drop outs) and overruns may result in lost sound. In these situations, even though rate limiting might balance out over the long term if an LLTE transaction applied to the rate limit (because a later LLT read would likely hit in the memory cache 130 and not require a credit), this situation might negatively affect the timing of isochronous traffic in the near term. Therefore, disclosed embodiments discussed below may advantageously provide more up-to-date rate limit information to properly handle LLTE transactions without interfering with other traffic such as isochronous requests.

In the illustrated example, one or both of rate limit control circuits 152 and 154 are configured to perform operations such that the write operation 166 does not count toward rate limit for traffic class A. As one example, in credit-based implementations, LLT requests from agent 140 may require and consume a credit and may stall when no credits are available for the agent. In this example, rate limit control 152 may consume a credit for an LLTE write but may also add an extra credit for agent 140, such that the LLTE transaction is credit-neutral from the perspective of agent 140 (in contrast to other LLT write operations that consume a credit without an extra credit being added). In some embodiments, the LLTE credit is added when an LLTE request is enqueued and consumed when LLT writes win arbitration (memory controller 110 may include arbitration circuitry that is configured to arbitrate among different channels or types of requests to access memory 120).

In some embodiments, cache 130 indicates LLTE operations to the memory controller 110 via a hint field and the memory controller adds a credit for agent 140 to rate limit controller 152 based on this field. Note, however, that LLTE transactions should not result in the generation of free credits, in some embodiments. For example, if rate limit control 152 was configured to return a credit to agent 140 for LLT transactions that do not end up using a rate limit credit, the completion of an LLTE transaction using a credit added to rate limit controller 152 should not return a credit to agent 140. In contrast, rate limit control 152 may be configured not to add a credit for agent 140 if an LLTE transaction does not actually consume a credit (e.g., if an incoming younger write to the same location causes the original LLTE write operation not to be needed) to avoid providing a free LLTE credit.

In credit-based systems, a leaky bucket technique may be utilized in which credits for transmitting LLT transactions are refilled (e.g., periodically) into the bucket, and the credits are consumed (leaked) from the bucket as transactions are issued. The bucket may have a threshold number of credits that the bucket is configured to hold (which may be programmable) and incoming credits after reaching the threshold point will overflow rather than being added to the bucket. If the bucket becomes empty (no credits remain), the rate limit circuit may prevent issuance of additional LLT transactions until sufficient credits have accumulated via the periodic refill mechanism. It is noted that the credits for the rate limit circuitry may be different from credits used in a communication fabric to ensure that resources are available at a receiving agent or intermediate circuit to handle a given transaction. Thus, a transaction request may need to have an appropriate number of the fabric resource credits to be issued by a requesting agent in addition to rate limit credits associated with the memory controller, for example. In some embodiments, the consumed credits may be added to a counter representing the bucket, and refill credits may be subtracted from the counter (e.g., the counter may be part of the control circuit 40). In this embodiment, a counter of zero may represent a full bucket and a counter equal to the limit may indicate an empty bucket (no transactions to be sent). In other embodiments, refill credits may be added from the counter and consumed credits may be subtracted from the counter. A counter equal to zero may indicate an empty bucket and a counter value equal to the limit may indicate a full bucket.

In other embodiments, memory controller 110 may simply perform LLTE operations without consuming a credit for the agent, in order to make these transactions rate-limit-neutral (in contrast to adding and consuming a credit). Note that while LLT and LLTE transactions are discussed herein as specific examples of a certain class of traffic and eviction writes for that class, similar techniques may be applied to any of various appropriate traffic classes; LLT and LLTE are discussed for purposes of explanation but are not intended to limit the scope of the present disclosure. Also note that while rate limit control circuitry is distributed in the illustrated embodiment, this circuitry may be included on only one side of a communication fabric in other embodiments (e.g., at memory controller 110 or at agent 140).

Example Separate Handling of Added Credits

In some embodiments, the system is configured to handle added credits for LLTE transactions separately from other LLT credits.

Figure 2:
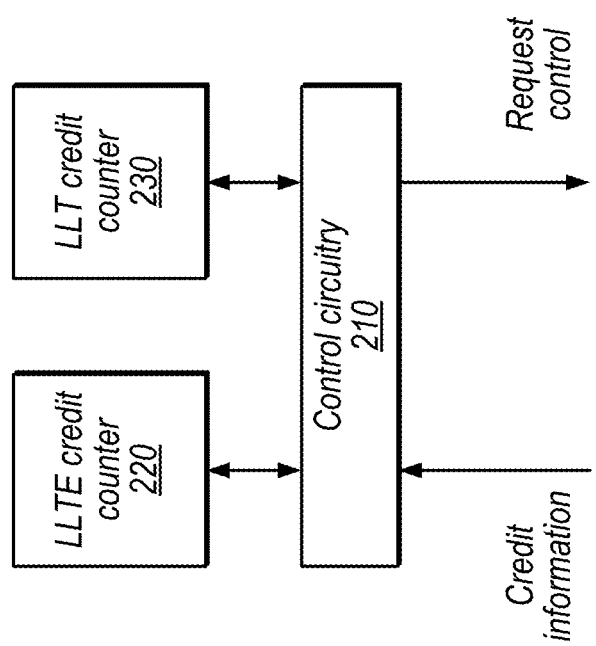
FIG. 2 is a block diagram illustrating example control circuitry configured to separately maintain credits for a class of traffic and eviction write operations for the class of traffic, according to some embodiments.

FIG. 2 is a block diagram illustrating example counter circuitry for separate LLTE and LLT credits, according to some embodiments. In the illustrated embodiment, the system includes control circuitry 210, LLTE credit counter 220, and LLT credit counter 230. In the illustrated example, separate counters are used to track LLTE and LLT credits. This may allow LLTE transactions to make progress even if no LLT credits would have been available. Control circuitry 210 may control when agent(s) are allowed to initiate requests based on current counter values. In some embodiments, the circuitry of FIG. 2 is included in rate limit control 152.

In the illustrated embodiment, LLTE credit counter 220 tracks the number of added credits from LLTE transactions for a given agent. In some embodiments, control circuitry prevents use of these credits for read operations. Therefore, in a situation where LLTE credit counter 220 indicates credits are available, the system may stall an LLT read transaction unless LLT credits are available (e.g., LLT credit counter 230 indicates credits are available via the request control output from circuitry 210).

In some embodiments, control circuitry 210 is configured to use any available credits reflected by counter 220 for LLT write operations prior to using credits reflected by counter 230.

In other embodiments, LLTE and LLT credits are not maintained separately. In these embodiments, a single counter may be used for credits that are shared by LLTE and LLT transactions.

Example Method

Figure 3:
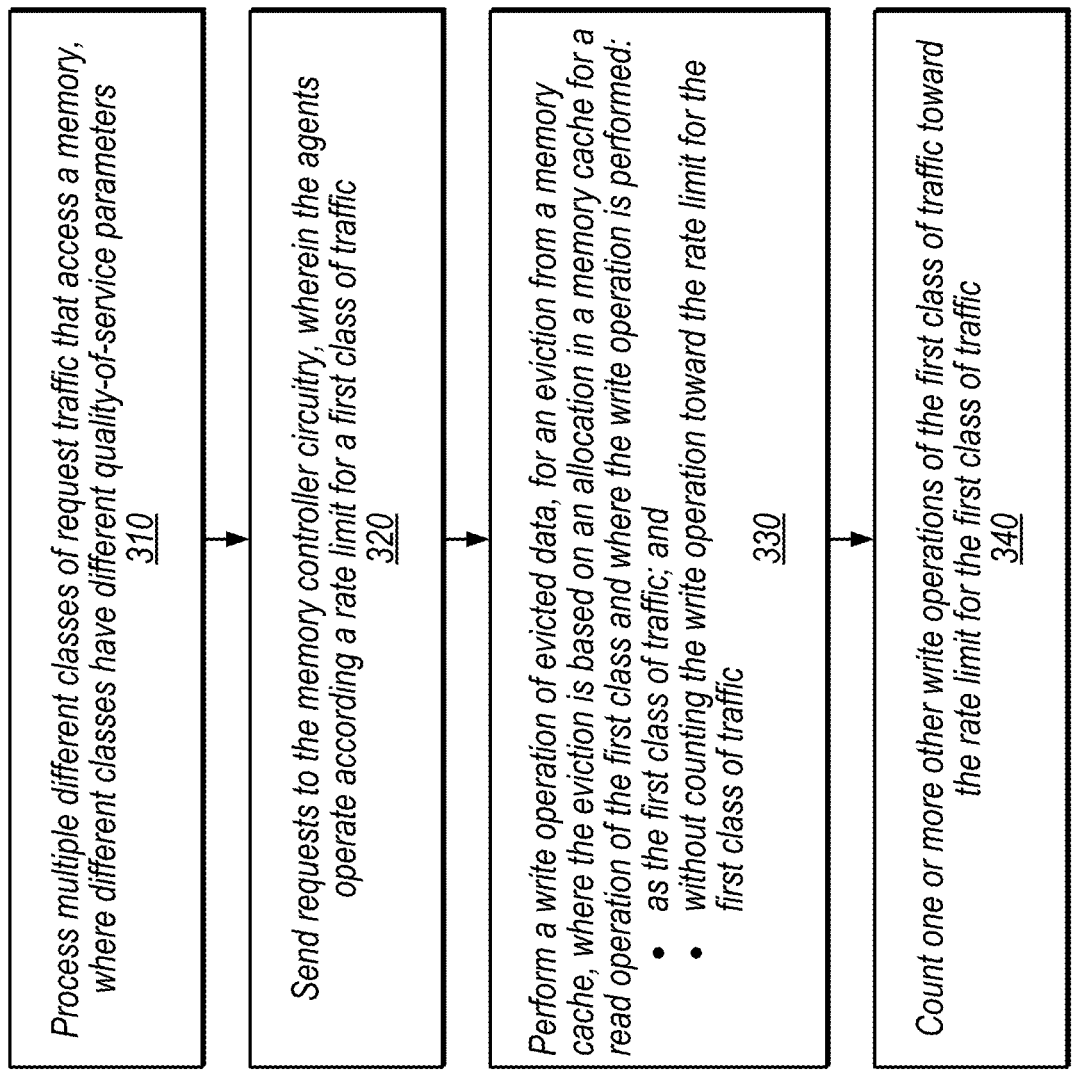
FIG. 3 is a flow diagram illustrating an example method, according to some embodiments.

FIG. 3 is a flow diagram illustrating an example method for handling an eviction write, according to some embodiments. The method shown in FIG. 3 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 310, in the illustrated embodiment, memory controller circuitry processes multiple different classes of request traffic that access a memory, where different classes have different quality-of-service parameters. In some embodiments, a quality-of-service parameter for the first class is a latency parameter, e.g., for LLT traffic. In some embodiments, the memory controller circuitry also implements a second class of traffic with a bandwidth quality-of-service parameter (e.g., RT traffic) and a third class of traffic that is not guaranteed bandwidth or latency (e.g., bulk traffic). In some embodiments, a communication fabric is coupled to the memory controller circuitry and the agents and supports multiple different virtual channels for different classes of traffic.

At 320, in the illustrated embodiment, multiple agents send requests to the memory controller circuitry, where the agents operate according to a rate limit for a first class of traffic. In some embodiments, the agents implement a credit system to enforce the rate limit. In some embodiments, the credit system is a leaky bucket system in which credits are added for a given agent periodically and the agent is not allowed to transmit requests of the first class of traffic if it does not have any credits available.

At 330, in the illustrated embodiment, the memory controller circuitry performs a write operation of evicted data for an eviction from a memory cache. In the illustrated embodiment, the eviction is based on an allocation in a memory cache for a read operation of the first class and the write operation is performed: (A) as the first class of traffic and (B) without counting the write operation toward the rate limit for the first class of traffic.

In some credit-based embodiments, the control circuitry is configured to perform the write operation of the evicted data in a credit-neutral manner to avoid counting the write operation toward the rate limit. In some embodiments, to perform the write operation in a credit-neutral manner, the control circuitry is configured to consume a credit of the first class of traffic and add a credit for the first class of traffic for the requesting agent. In some embodiments, the control circuitry is configured to perform other write operations of the first class of traffic in a non-credit-neutral manner (e.g., by consuming a credit without adding any credits).

In some embodiments, the control circuitry maintains first credits for the first class of traffic for the requesting agent that are usable for both read and write operations and maintains added credits for the requesting agent separately from the first credits. The control circuitry may prevent use of added credits for read operations and may use any available added credits prior to using the first credits for write operations.

In other embodiments, to perform the write operation in a credit-neutral manner, the control circuitry is configured to perform the write operation without consuming a credit.

At 340, in the illustrated embodiment, the memory controller counts one or more other write operations of the first class of traffic toward the rate limit for the first class of traffic.

Example Device

Figure 4:
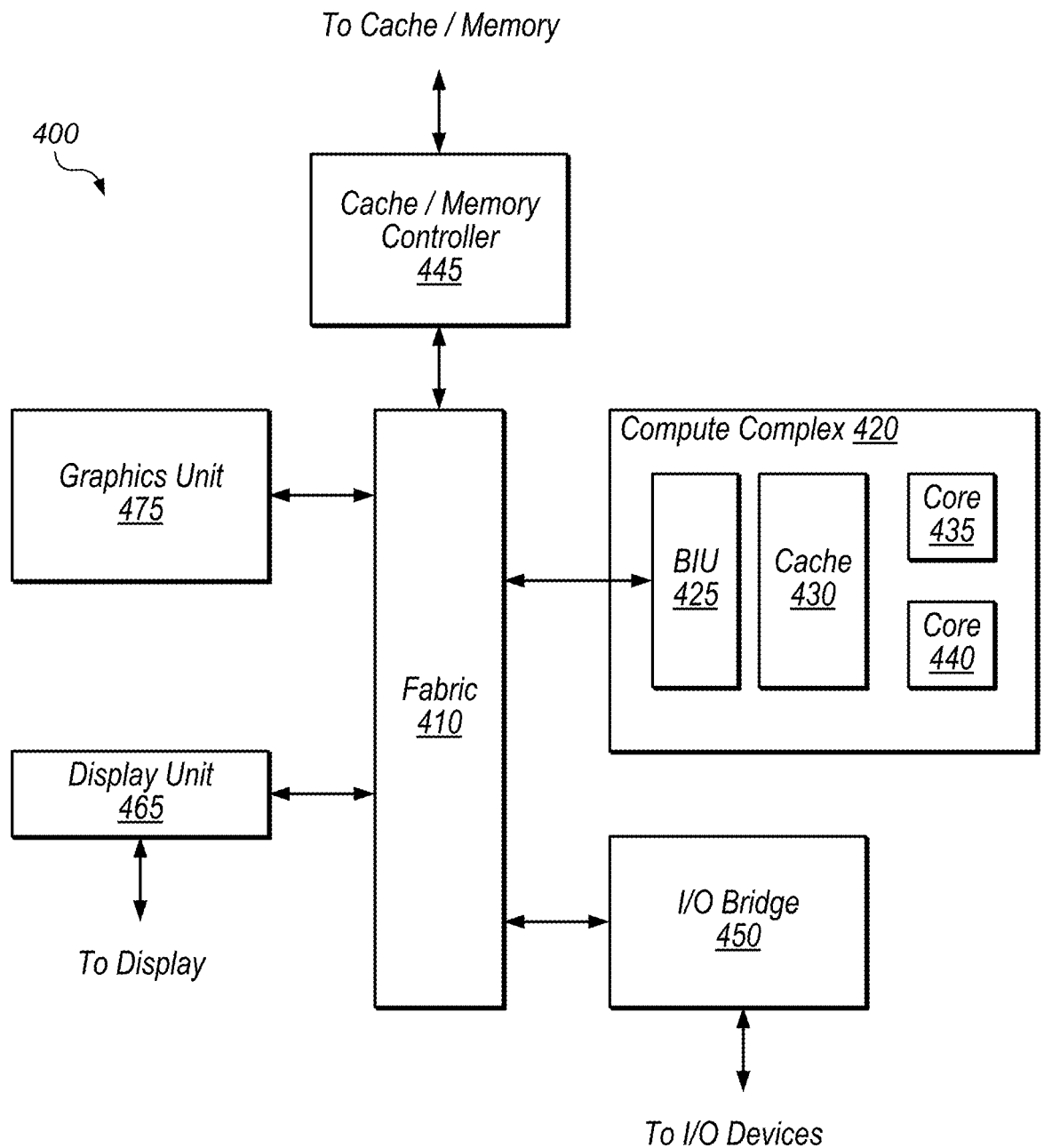
FIG. 4 is a block diagram illustrating an example computing device, according to some embodiments.

Referring now to FIG. 4, a block diagram illustrating an example embodiment of a device 400 is shown. In some embodiments, elements of device 400 may be included within a system on a chip. In some embodiments, device 400 may be included in a mobile device, which may be battery-powered. Therefore, power consumption by device 400 may be an important design consideration. In the illustrated embodiment, device 400 includes fabric 410, compute complex 420 input/output (I/O) bridge 450, cache/memory controller 445, graphics unit 475, and display unit 465. In some embodiments, device 400 may include other components (not shown) in addition to or in place of the illustrated components, such as video processor encoders and decoders, image processing or recognition elements, computer vision elements, etc.

Fabric 410 may include various interconnects, buses, MUX's, controllers, etc., and may be configured to facilitate communication between various elements of device 400. In some embodiments, portions of fabric 410 may be configured to implement various different communication protocols. In other embodiments, fabric 410 may implement a single communication protocol and elements coupled to fabric 410 may convert from the single communication protocol to other communication protocols internally.

In the illustrated embodiment, compute complex 420 includes bus interface unit (BIU) 425, cache 430, and cores 435 and 440. In various embodiments, compute complex 420 may include various numbers of processors, processor cores and caches. For example, compute complex 420 may include 1, 2, or 4 processor cores, or any other suitable number. In one embodiment, cache 430 is a set associative L2 cache. In some embodiments, cores 435 and 440 may include internal instruction and data caches. In some embodiments, a coherency unit (not shown) in fabric 410, cache 430, or elsewhere in device 400 may be configured to maintain coherency between various caches of device 400. BIU 425 may be configured to manage communication between compute complex 420 and other elements of device 400. Processor cores such as cores 435 and 440 may be configured to execute instructions of a particular instruction set architecture (ISA) which may include operating system instructions and user application instructions.

Cache/memory controller 445 may be configured to manage transfer of data between fabric 410 and one or more caches and memories. For example, cache/memory controller 445 may be coupled to an L3 cache, which may in turn be coupled to a system memory. In other embodiments, cache/memory controller 445 may be directly coupled to a memory. In some embodiments, cache/memory controller 445 may include one or more internal caches. In some embodiments, memory controller 110 and cache 130 are included in element 445 and may improve communications with various agents via fabric 410, relative to traditional techniques.

As used herein, the term "coupled to" may indicate one or more connections between elements, and a coupling may include intervening elements. For example, in FIG. 4, graphics unit 475 may be described as "coupled to" a memory through fabric 410 and cache/memory controller 445. In contrast, in the illustrated embodiment of FIG. 4, graphics unit 475 is "directly coupled" to fabric 410 because there are no intervening elements.

Graphics unit 475 may include one or more processors, e.g., one or more graphics processing units (GPU's). Graphics unit 475 may receive graphics-oriented instructions, such as OPENGL®, Metal, or DIRECT3D® instructions, for example. Graphics unit 475 may execute specialized GPU instructions or perform other operations based on the received graphics-oriented instructions. Graphics unit 475 may generally be configured to process large blocks of data in parallel and may build images in a frame buffer for output to a display, which may be included in the device or may be a separate device. Graphics unit 475 may include transform, lighting, triangle, and rendering engines in one or more graphics processing pipelines. Graphics unit 475 may output pixel information for display images. Graphics unit 475, in various embodiments, may include programmable shader circuitry which may include highly parallel execution cores configured to execute graphics programs, which may include pixel tasks, vertex tasks, and compute tasks (which may or may not be graphics-related).

Display unit 465 may be configured to read data from a frame buffer and provide a stream of pixel values for display. Display unit 465 may be configured as a display pipeline in some embodiments. Additionally, display unit 465 may be configured to blend multiple frames to produce an output frame. Further, display unit 465 may include one or more interfaces (e.g., MIPI® or embedded display port (eDP)) for coupling to a user display (e.g., a touchscreen or an external display).

I/O bridge 450 may include various elements configured to implement: universal serial bus (USB) communications, security, audio, and low-power always-on functionality, for example. I/O bridge 450 may also include interfaces such as pulse-width modulation (PWM), general-purpose input/output (GPIO), serial peripheral interface (SPI), and inter-integrated circuit (I2C), for example. Various types of peripherals and devices may be coupled to device 400 via I/O bridge 450.

In some embodiments, device 400 includes network interface circuitry (not explicitly shown), which may be connected to fabric 410 or I/O bridge 450. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 400 with connectivity to various types of other devices and networks.

Example Applications

Figure 5:
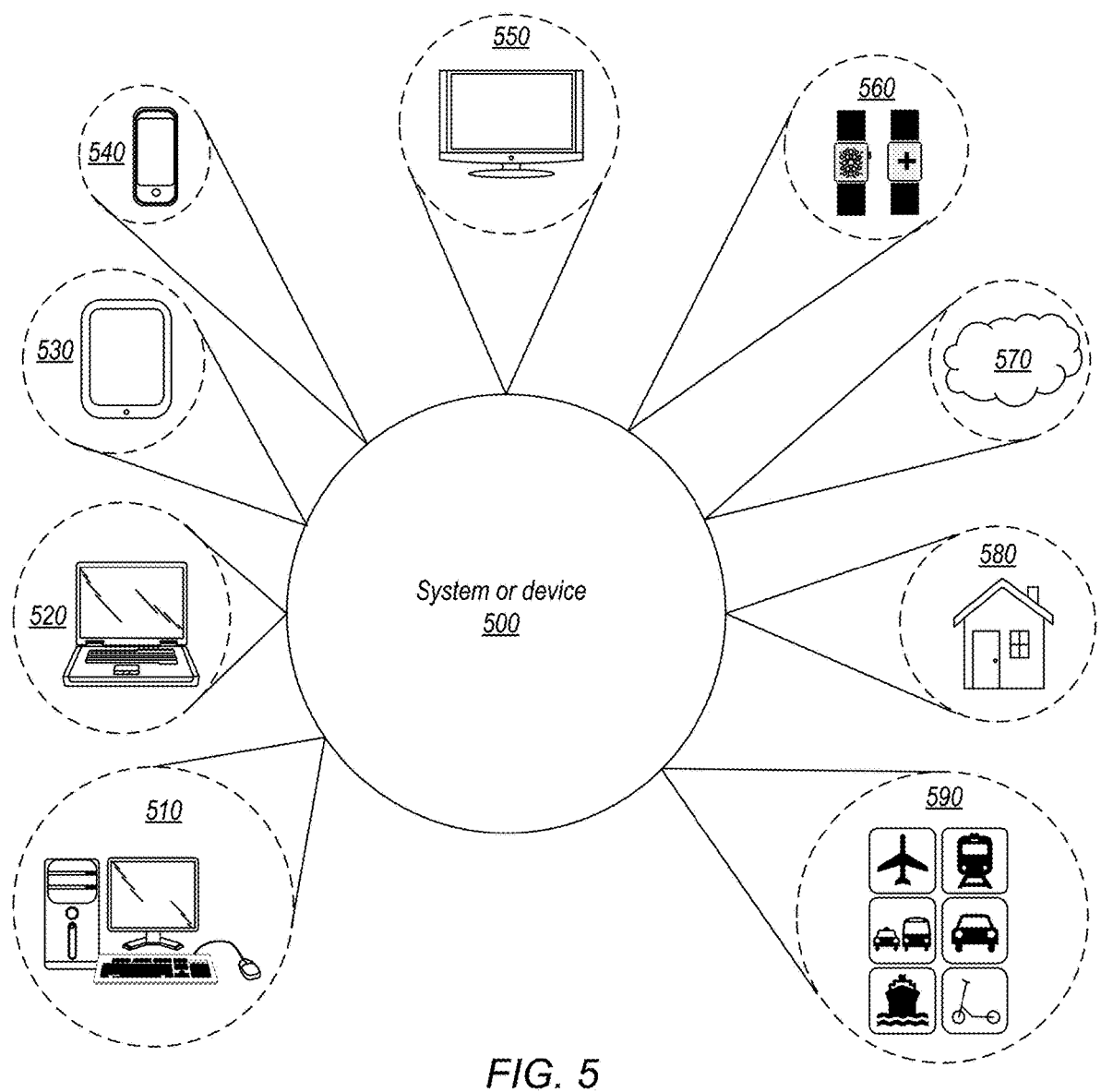
FIG. 5 is a diagram illustrating example applications of disclosed systems and devices, according to some embodiments.

Turning now to FIG. 5, various types of systems that may include any of the circuits, devices, or system discussed above. System or device 500, which may incorporate or otherwise utilize one or more of the techniques described herein, may be utilized in a wide range of areas. For example, system or device 500 may be utilized as part of the hardware of systems such as a desktop computer 510, laptop computer 520, tablet computer 530, cellular or mobile phone 540, or television 550 (or set-top box coupled to a television).

Similarly, disclosed elements may be utilized in a wearable device 560, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 500 may also be used in various other contexts. For example, system or device 500 may be utilized in the context of a server computer system, such as a dedicated server or on shared hardware that implements a cloud-based service 570. Still further, system or device 500 may be implemented in a wide range of specialized everyday devices, including devices 580 commonly found in the home such as refrigerators, thermostats, security cameras, etc. The interconnection of such devices is often referred to as the "Internet of Things" (IoT). Elements may also be implemented in various modes of transportation. For example, system or device 500 could be employed in the control systems, guidance systems, entertainment systems, etc. of various types of vehicles 590.

The applications illustrated in FIG. 5 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 6:
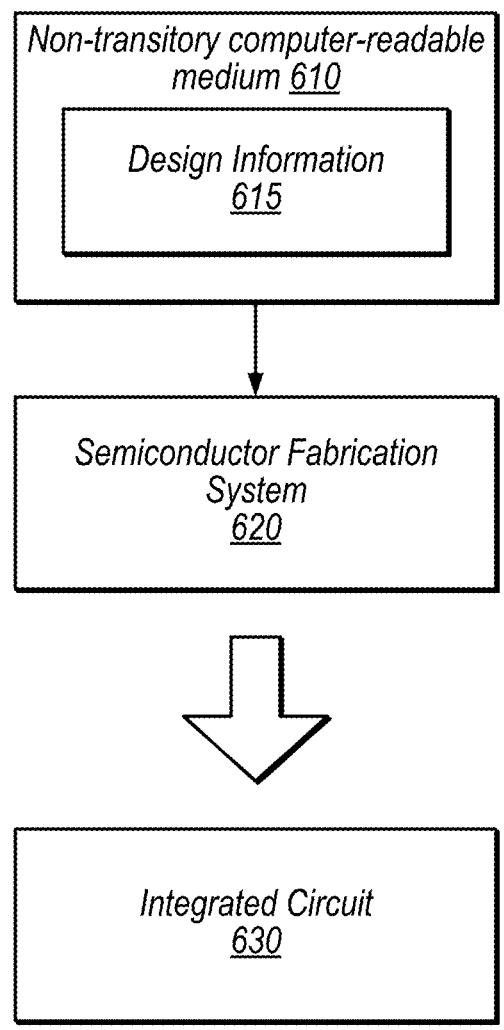
FIG. 6 is a block diagram illustrating an example computer-readable medium that stores circuit design information, according to some embodiments.

FIG. 6 is a block diagram illustrating an example non-transitory computer-readable storage medium that stores circuit design information, according to some embodiments. In the illustrated embodiment semiconductor fabrication system 620 is configured to process the design information 615 stored on non-transitory computer-readable medium 610 and fabricate integrated circuit 630 based on the design information 615.

Non-transitory computer-readable storage medium 610, may comprise any of various appropriate types of memory devices or storage devices. Non-transitory computer-readable storage medium 610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 610 may include other types of non-transitory memory as well or combinations thereof. Non-transitory computer-readable storage medium 610 may include two or more memory mediums which may reside in different locations, e.g., in different computer systems that are connected over a network.

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabricate at least a portion of integrated circuit 630. The format of design information 615 may be recognized by at least one semiconductor fabrication system 620. In some embodiments, design information 615 may also include one or more cell libraries which specify the synthesis, layout, or both of integrated circuit 630. In some embodiments, the design information is specified in whole or in part in the form of a netlist that specifies cell library elements and their connectivity. Design information 615, taken alone, may or may not include sufficient information for fabrication of a corresponding integrated circuit. For example, design information 615 may specify the circuit elements to be fabricated but not their physical layout. In this case, design information 615 may need to be combined with layout information to actually fabricate the specified circuitry.

Integrated circuit 630 may, in various embodiments, include one or more custom macrocells, such as memories, analog or mixed-signal circuits, and the like. In such cases, design information 615 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements shown in FIGS. 1, 2, and 4. Further, integrated circuit 630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application (including Appendix A, which includes material from two prior patent applications relating to rate limiting and communication fabric channels) may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of U.S. patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a U.S. patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   control circuitry;
   memory controller circuitry configured to satisfy different quality-of-service parameters for multiple different classes of request traffic that access a memory;
   multiple agents configured to send requests to the memory controller circuitry, wherein:
      the control circuitry is configured to impose a rate limit for a first class of traffic utilized by an agent of the multiple agents and provide a latency quality-of-service guarantee for the first class of traffic; and
      the memory controller circuitry is configured to process at least the following types of operations in the first class of traffic: read requests and write requests; and
   cache circuitry configured to cache data from the memory;
   wherein the control circuitry is further configured to:
      determine to allocate an entry in the cache circuitry for first data from a read operation that reads from the memory;
      evict second data from the cache circuitry to the memory, to free the entry in the cache circuitry for the allocation;
      perform the read operation to read the first data from the memory while providing the latency quality-of-service guarantee to the read operation and counting the read operation toward the rate limit for the first class of traffic;

perform a write operation of the evicted second data to the memory as the first class of traffic, while providing the latency quality-of-service guarantee to the write operation of the evicted second data, but without counting the write operation of the evicted second data toward the rate limit for the first class of traffic; and store the read first data into the allocated entry in the cache circuitry;

wherein the control circuitry is configured to count one or more other write operations, to the memory and of the first class of traffic, toward the rate limit for the first class of traffic.

2. The apparatus of claim 1, wherein:

the agent of the multiple agents implements a credit system to enforce the rate limit for the first class of traffic;

the control circuitry is configured to perform the write operation of the evicted second data in a credit-neutral manner; and wherein the control circuitry is configured to perform the one or more other write operations of the first class of traffic in a non-credit-neutral manner.

3. The apparatus of claim 2, wherein, to perform the write operation of the evicted second data in the credit-neutral manner, the control circuitry is configured to consume a credit of the first class of traffic and add a credit for the first class of traffic for the agent of the multiple agents.

4. The apparatus of claim 3, wherein the control circuitry is configured to:

maintain first credits for the agent of the multiple agents for the first class of traffic that are usable for both read and write operations;

maintain added credits for the agent of the multiple agents separately from the first credits; and prevent use of the added credits for the read operations.

5. The apparatus of claim 4, wherein the agent of the multiple agents is configured to:

use any available added credits prior to using the first credits for the write operations.

6. The apparatus of claim 2, wherein, to perform the write operation of the evicted second data in the credit-neutral manner, the control circuitry is configured to perform the write operation of the evicted second data without consuming a credit.

7. The apparatus of claim 2, wherein the credit system is a leaky bucket system in which credits are added for a given agent periodically and the agent of the multiple agents is not allowed to transmit requests of the first class of traffic if the agent of the multiple agents does not have any credits available.

8. The apparatus of claim 1, wherein the memory controller circuitry also implements a second class of traffic with a bandwidth quality-of-service parameter and a third class of traffic that is not guaranteed bandwidth or latency.

9. The apparatus of claim 1, further comprising:

a communication fabric coupled to the memory controller circuitry and the multiple agents, wherein the communication fabric supports multiple different virtual channels for different classes of traffic.

10. The apparatus of claim 1, wherein the apparatus is a computing device that further includes:

a central processing unit;
a display; and
network interface circuitry.

11. A method, comprising:

processing, by memory controller circuitry of a computing system, multiple different classes of request traffic that access a memory, wherein different classes have different quality-of-service parameters;

sending, by multiple agents of the computing system, requests to the memory controller circuitry, wherein control circuitry of the computing system imposes a rate limit for a first class of traffic utilized by an agent of the multiple agents and provides a latency quality-of-service guarantee for the first class of traffic;

processing, by the memory controller circuitry, at least the following types of operations in the first class of traffic: read requests and write requests;

determining, by the computing system, to allocate an entry in a memory cache for first data from a read operation that reads from the memory;

evicting, by the computing system, second data from the memory cache to the memory, to free the entry in the memory cache for the allocation;

performing, by the memory controller circuitry, the read operation to read the first data from the memory while providing the latency quality-of-service guarantee to the read operation and counting the read operation toward the rate limit for the first class of traffic;

performing, by the memory controller circuitry, a write operation of the evicted second data to the memory as the first class of traffic, while providing the latency quality-of-service guarantee to the write operation of the evicted second data, but without counting the write operation of the evicted second data toward the rate limit for the first class of traffic;

storing, by the computing system, the read first data into the allocated entry in the memory cache; and counting, by the computing system, one or more other write operations, to the memory and of the first class of traffic, toward the rate limit for the first class of traffic.

12. A non-transitory computer readable storage medium having stored thereon design information that specifies a design of at least a portion of a hardware integrated circuit in a format recognized by a semiconductor fabrication system that is configured to use the design information to produce the hardware integrated circuit according to the design, wherein the design information specifies that the hardware integrated circuit includes:

control circuitry;

memory controller circuitry configured to satisfy different quality-of-service parameters for multiple different classes of request traffic that access a memory;

multiple agents configured to send requests to the memory controller circuitry, wherein:

the control circuitry is configured to impose a rate limit for a first class of traffic utilized by an agent of the multiple agents and provide a latency quality-of-service guarantee for the first class of traffic; and the memory controller circuitry is configured to process at least the following types of operations in the first class of traffic: read requests and write requests; and cache circuitry configured to cache data from the memory;

wherein the control circuitry is further configured to:

determine to allocate an entry in the cache circuitry for first data from a read operation that reads from the memory;

evict second data from the cache circuitry to the memory, to free the entry in the cache circuitry for the allocation;

perform the read operation to read the first data from the memory while providing the latency quality-of-service guarantee to the read operation and counting the read operation toward the rate limit for the first class of traffic;

perform a write operation of the evicted second data to the memory as the first class of traffic, while providing the latency quality-of-service guarantee to the write operation of the evicted second data, but without counting the write operation of the evicted second data toward the rate limit for the first class of traffic; and store the read first data into the allocated entry in the cache circuitry;

wherein the control circuitry is configured to count one or more other write operations, to the memory and of the first class of traffic, toward the rate limit for the first class of traffic.

13. The non-transitory computer readable storage medium of claim 12, wherein:

the agent of the multiple agents implements a credit system to enforce the rate limit for the first class of traffic;

the control circuitry is configured to perform the write operation of the evicted second data in a credit-neutral manner; and wherein the control circuitry is configured to perform the one or more other write operations of the first class of traffic in a non-credit-neutral manner.

14. The non-transitory computer readable storage medium of claim 13, wherein, to perform the write operation of the evicted second data in the credit-neutral manner, the control circuitry is configured to consume a credit of the first class of traffic and add a credit for the first class of traffic for the agent of the multiple agents.

15. The non-transitory computer readable storage medium of claim 14, wherein the control circuitry is configured to:

maintain first credits for the agent of the multiple agents for the first class of traffic that are usable for both read and write operations;

maintain added credits for the agent of the multiple agents separately from the first credits; and prevent use of the added credits for the read operations.

16. The non-transitory computer readable storage medium of claim 15, use any available added credits prior to using the first credits for the write operations.

17. The non-transitory computer readable storage medium of claim 13, wherein the credit system is a leaky bucket system in which credits are added for a given agent periodically and the agent of the multiple agents is not allowed to transmit requests of the first class of traffic if the agent of the multiple agents does not have any credits available.

18. The non-transitory computer readable storage medium of claim 12, wherein the design information further specifies that the hardware integrated circuit includes:

a communication fabric coupled to the memory controller circuitry and the multiple agents, wherein the communication fabric supports multiple different virtual channels for different classes of traffic.

* * * * *